United States Patent
Beekhuis (10) Patent No.: US 7,779,290 B2
(45) Date of Patent: Aug. 17, 2010

(54) COMPUTER IMPLEMENTED SYSTEMS AND METHODS FOR PRE-EMPTIVE SERVICE AND IMPROVED USE OF SERVICE RESOURCES

(75) Inventor: Christiaan Willem Beekhuis, San Jose, CA (US)

(73) Assignee: Fat Spaniel Technologies, Inc., San Jose, CA (US)

( * ) Notice: Subject to any disclaimer, the term of this patent is extended or adjusted under 35 U.S.C. 154(b) by 466 days.

(21) Appl. No.: 11/919,041

(22) PCT Filed: Apr. 28, 2006

(86) PCT No.: PCT/US2006/016442
§ 371 (c)(1),
(2), (4) Date: Oct. 22, 2007

(87) PCT Pub. No.: WO2006/119108
PCT Pub. Date: Nov. 9, 2006

(65) Prior Publication Data
US 2009/0313496 A1    Dec. 17, 2009

Related U.S. Application Data

(60) Provisional application No. 60/676,390, filed on Apr. 29, 2005.

(51) Int. Cl.
*G06F 11/00* (2006.01)
(52) U.S. Cl. .............................. 714/2; 714/1
(58) Field of Classification Search ............... 714/1, 714/2, 4, 37, 47
See application file for complete search history.

(56) References Cited

U.S. PATENT DOCUMENTS

| | | | |
|---|---|---|---|
| 5,566,084 A | 10/1996 | Cmar | |
| 5,930,773 A | 7/1999 | Crooks et al. | |
| 6,169,979 B1 | 1/2001 | Johnson | |
| 6,519,730 B1 | 2/2003 | Ando et al. | 714/746 |
| 6,978,931 B2 | 12/2005 | Brobeck | |
| 2002/0019802 A1 | 2/2002 | Malme et al. | |
| 2002/0087234 A1 | 7/2002 | Lof et al. | |
| 2003/0115251 A1 | 6/2003 | Fredrickson et al. | |
| 2003/0126060 A1 | 7/2003 | Lof et al. | |
| 2004/0143428 A1 | 7/2004 | Rappaport et al. | |
| 2004/0163011 A1 | 8/2004 | Shaw | |
| 2004/0205403 A1 | 10/2004 | Markow et al. | |
| 2004/0260981 A1 | 12/2004 | Kitamorn et al. | |
| 2005/0229039 A1 | 10/2005 | Anderson et al. | |

*Primary Examiner*—Dieu-Minh Le
(74) *Attorney, Agent, or Firm*—Michaelson & Associates; Peter L. Michaelson; Aubrey Helms (57) ABSTRACT

Systems and methods are provided for collecting, aggregating, and analyzing data associated with the installation and deployment of systems. Energy systems, (500) specifically renewable energy generation systems, are used as examples. The aggregated data serve as the basis for a variety of services that improve the system performance, improve the installation, lower the cost, and provide monitoring and service to maintain optimum performance. Finally, services are provided that facilitate the optimization of responses to poor system performance based on criticality of the failure, servicing of the system by a Certified VAR, or other prioritization method.

20 Claims, 6 Drawing Sheets

COMPUTER IMPLEMENTED SYSTEMS AND METHODS FOR PRE-EMPTIVE SERVICE AND IMPROVED USE OF SERVICE RESOURCES

FIELD OF THE INVENTION

In general, the present invention relates to computer implemented systems and methods for providing services to a network of customers, more specifically to services enabled by methods comprising the collection, aggregation, and analysis of data in a central database from a plurality of systems that are not otherwise associated with one another to provide performance metrics and most particularly to the establishment and improvement of various performance metrics related to the execution of customer activities and the initiation of specific actions related to performance in comparison with such metrics. More specifically, the present invention relates to computer implemented services enabled by systems and methods comprising the collection, aggregation, and analysis of data related to the installation and operation of renewable energy systems comprising solar energy, wind turbine energy, tidal energy, geothermal energy, and the like, or to distributed energy generation systems comprising waste-to-energy generation systems, fuel cells, microturbines, diesel generators, and the like.

BACKGROUND OF THE INVENTION

There is increased interest in the development and deployment of renewable energy systems comprising solar energy, wind turbine energy, tidal energy, geothermal energy, and the like, or to distributed energy generation systems comprising waste-to-energy generation systems, fuel cells, microturbines, diesel generators, and the like. This interest is being driven by a number of factors including a limited supply of fossil fuels, global warming considerations, increased pollution from the acquisition and use of fossil fuels, rising costs of fossil fuels, the loss of natural lands due to the construction of fossil fuel power plants, continued utility grid degradation and blackouts, unpredictable energy prices, the need for local power generation in disaster recovery situations, the need to move away from centralized power plants to distributed energy systems for homeland security, and the like. Advancements in the development of renewable energy and distributed energy generation technologies have overcome earlier impediments such as poor efficiency, installation difficulty, high cost, high maintenance, and the like and are presently offering increasingly attractive alternatives to fossil fuel power systems in the generation and delivery of electric power.

One of the issues faced by the renewable energy and distributed energy generation industries is that the adoption and deployment of such systems is often sporadic and not well coordinated. The decision to invest in and install a renewable energy or distributed energy generation system is typically made at the individual entity level rather than as a planned activity for an entire community. For economy of language, in this context, an "entity" may comprise an individual, a company, an office building, a shopping mall, a shopping center, a sports complex, or other such organization, business, or group investing collectively in a source of energy. Consequently, the renewable energy and distributed energy generation industries often lack the coordinated, integrated infrastructure that is typically common in other industries. The lack of infrastructure inhibits the adoption and installation of new renewable energy and distributed energy generation systems and does not allow these industries to gain advantages due to cooperation or economies of scale to lower costs, increase acceptance and deployment, and attract additional investment capital.

Accordingly, there is a need for further developments in methods and systems to facilitate the connection and cooperation of the wide variety of entities and individual implementations of renewable energy or distributed energy generation systems to improve efficiencies, lower costs, facilitate new services, facilitate management and improvement of the energy production and distribution system as a whole, facilitate and improve training and education, facilitate energy commerce, and the like. In particular, there is a need for improved systems and methods to offer services to Supply Chain Entities comprising remote system monitoring, remote detection of system performance degradation, remote system troubleshooting, corrective action activities, service priority scheduling, and the like.

BRIEF SUMMARY OF THE INVENTION

Advancements in the development of renewable energy and distributed energy generation systems have overcome, to a large extent, earlier impediments such as poor efficiency, installation difficulty, high cost, high maintenance, and the like. Specifically, advancements in the technology associated with the capture and conversion of solar energy into useable electricity has led to an increased adoption and deployment rate of solar energy generation systems. However, the infrastructure associated with collecting and analyzing data associated with the distribution infrastructure, system performance, system response, system efficiency, costs, savings associated with the system, and the like has not grown at the same pace as the implementation of solar energy generation systems. Systems and methods for the collection, aggregation, and analyzing of this data and providing services based on the results of the analysis have been developed as part of some embodiments of the present invention.

In some embodiments of the present invention, the data collection systems and methods cited above may use a local communications device installed at the site of the renewable energy generation or distributed energy generation system to collect data on the system comprising system ID, location, performance, calibration, ambient conditions, efficiency, temperature, wind speed, wind direction, solar irradiance, energy generation, device status flags, and the like. Typical data collection systems comprise embedded sensors, external sensors, embedded computers, and the like. Typical local communications devices comprise modems, routers, switches, embedded computers, wireless transmitters, and the like. The data may be transmitted via a wireless or hard-wired network or other communication means to a secure, central database where the data is aggregated with data from other systems and analyzed to provide value added services to the members of the renewable energy or distributed energy generation supply chain. Examples of suitable networks comprise the Internet, a Local Area Network (LAN), a Wide Area Network (WAN), a wireless network, cellular networks (e.g., GSM, GPRS, etc.), combinations thereof, and the like. Various embodiments of the present invention include security features such that proprietary or business-sensitive data is not accessible among different business entities, thereby providing all entities access to aggregated information while compromising the security of none.

Various embodiments of the present invention relate generally to systems and methods that utilize the secure, centrally collected, aggregated, and analyzed data to provide a number of beneficial services. The services may be desirable and useful to many "Supply Chain Entities" within the renewable energy or distributed energy generation system supply chain. For economy of language, we use the term, Supply Chain Entity or Entities to refer to one or more of the "Installation Technician", the "Value Added Reseller (VAR)", the "System Integrator", the "Original Equipment Manufacturer (OEM)" component supplier, the "local energy utility", various local government agencies, the Project Financier or Investor, the Distributed Utility provider, among others. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In some embodiments of the present invention, the aggregated data may be used to offer services to the System Integrators, VARs and OEMs that improve the response to conditions of poor system performance. The services may determine if replacement or upgraded software, hardware, or firmware might be required as a result of an automated troubleshooting and corrective action routine. The services may generate a demand for the software, hardware, or firmware and may notify the System Integrators, VARs and OEMs that the software, hardware, or firmware may be required to return the system to expected performance. Additionally, in the case of a hardware failure, the services may determine if the hardware failure may be due to normal product lifetime performance or may be unexpected based on the aggregated data from the network. In the case of normal lifetime failure, the services may generate notices, forms, list of nearby drop-off locations, shipping labels and the like to make sure the old hardware is properly discarded or recycled upon replacement. In the case of unexpected failure, the services may generate notices, RMA numbers, forms, list of locations of nearest authorized dealers, shipping labels and the like to make sure the old hardware is returned to the OEMs for failure analysis upon replacement.

In some embodiments of the present invention, the aggregated data may be used to offer services to the various Supply Chain Entities that may highlight hardware that may be nearing the end of its useful life and may need replacing before the hardware exhibits a failure. The aggregated database may allow a Mean Time Between Failure attribute to be established for the hardware with high confidence. The services may use this attribute to notify the various Supply Chain Entities that a system may be comprised of hardware that is nearing the end of its useful life. This may produce an opportunity for an upgrade or sales opportunity for the Supply Chain Entities. Additionally, the End User may gain the benefit of improved system performance and minimized system downtime.

In some embodiments of the present invention, the aggregated data may be used to offer services to the System Integrators and VARs that improve and coordinate the responses to service requests. Typically, a request for service may be generated either automatically by the system or by communication from the End User. The services may perform an automated troubleshooting routine to determine the likely reason for poor performance or failure. The services may then compare the failure to a critical or safety-related failure list. If the failure is on the critical failure list, the system may require immediate attention and the system may be given a high priority for attention. If the failure is not on the critical failure list, the service may automatically determine if the system performance is likely to fall below the performance guarantee for the current guarantee period and is serviced by a VAR on a "Certified VAR" list. Systems that are serviced by a VAR on a Certified VAR list and might fall below the performance guarantee for the current guarantee period may be given a next level of priority for attention. Systems that are not serviced by a VAR on a Certified VAR list and may not fall below the performance guarantee for the current guarantee period may be given a priority for attention as determined by any number of priority parameters such as a priority based on a "First-In-First-Out (FIFO)" system, priority based on the shortest time to respond, priority based on the lowest cost to respond, priority based on the strategic value of the End User, and the like. The System Integrator may enjoy the benefits of prioritized customer service based on criticality of failures, participation in the Certified VAR network, and financial exposure due to failure to meet performance guarantees.

The methods of some embodiments of the present invention may be implemented on a plurality of systems. The systems may comprise one or more energy systems, sensors contained within the energy systems to monitor various settings and performance attributes of the energy systems, sensors associated with the energy systems to measure various environmental conditions, a communications device for managing two-way communications between the sensors, the energy systems, and a network, a network for transmitting the data to a centralized database, a centralized database for receiving and storing data from a plurality of systems, user interfaces for interacting with the centralized database, procedures for acting upon the data, and a plurality of output means for displaying the results of the procedure treatments.

BRIEF DESCRIPTION OF THE DRAWINGS

Other aspects, embodiments and advantages of the invention may become apparent upon reading of the detailed description of the invention and the appended claims provided below, and upon reference to the drawings in which:

DETAILED DESCRIPTION OF THE INVENTION

In general, various embodiments of the present invention relate to systems and methods that utilize secure, centrally collected, aggregated, and analyzed data to provide a number of beneficial services. The services may be desirable and useful to many Supply Chain Entities within the renewable energy or distributed energy generation system supply chain.

Figure 1:
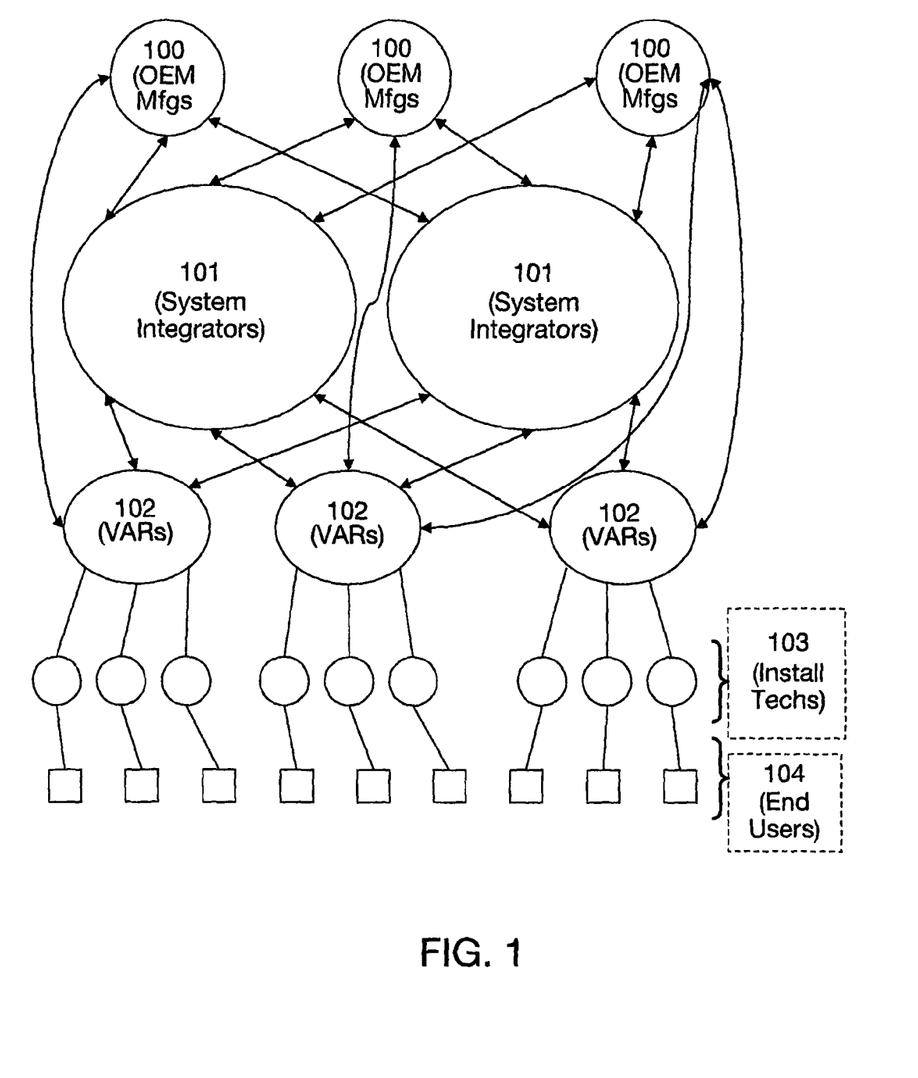
FIG. 1 is a schematic representation of a portion of a typical renewable energy or distributed generation system supply chain.

In some embodiments of the present invention, the systems and methods provide services to the various Supply Chain Entities in the renewable energy or distributed energy generation system supply chain. As an illustration, consider the supply chain structure illustrated in FIG. 1 wherein, large national Systems Integrators, 101, market and sell the renewable energy or distributed energy generation systems to End Users, 104. Typically, the System Integrators may design and oversee the installation and commissioning of the renewable energy or distributed energy generation systems. The System Integrators may contract with VARs, 102, who are local to the End Users and who may perform services comprising installation, service, upgrades, retrofits, and the like on behalf of the System Integrators. Furthermore, the VARs may employ a plurality of Installation Technicians, 103, who may perform services comprising installation, service, upgrades, retrofits, and the like on behalf of the VARs. OEM component suppliers, 100, may supply components to the System Integrators, 101, or the VARs, 102. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In an exemplary embodiment of the present invention, the systems and methods may be applied to a solar energy generation system. However, the solar energy example does not limit the scope of the present invention in any way. The systems and methods described herein may be applied to any general system. Specifically, the systems and methods described herein may be applied to any general energy system such as an energy consumption system, an energy generation system, an energy storage system, combinations thereof, and the like. More specifically, the systems and methods described herein may be applied to any renewable energy generation comprising solar energy, wind turbine energy, tidal energy, geothermal energy, and the like, or distributed energy generation technology comprising waste-to-energy generation technologies, fuel cells, microturbines, diesel generators, and the like or any combination thereof. In the context of the present teaching, a system comprising more than one type of system as listed above will be designated a "hybrid" system.

Typically, the solar energy system may be installed by an Installation Technician following an established installation checklist. The system may be connected to a central database via a network. Examples of suitable networks comprise the Internet, a Local Area Network (LAN), a Wide Area Network (WAN), a wireless network, cellular networks (e.g., GSM, GPRS, etc.), combinations thereof, and the like. In this exemplary embodiment, System Identification Data are collected at the point of sale by the System Integrator or the VAR, said System Identification Data comprising, End User identification, system warranty information, system performance guarantee commitment information, expected system power output, and the like. The System Identification Data are static in time meaning that they may not generally change once established. The System Identification Data may be entered into the central database and serve as a unique identifier for the system. System Configuration Data are collected during the manufacture and testing of the system, said System Configuration Data comprising, system configuration with OEM component identification, system wiring details, system tracking features, expected shading and the like. The System Configuration Data are generally static in time meaning that they may not generally change once established. However, the System Configuration Data may change during periods of service, upgrades, or enhancements to the system. The System Configuration Data may be entered into the central database and associated with the unique System Identification Data previously entered. System Installation Data are collected at the time of installation, said System Installation Data comprising, VAR identity, Installation Technician identity, installation region, system orientation, system tilt angle, expected shading, time to complete the system installation, number of errors during the system installation, an End User satisfaction index (EUSI), firmware revision, system parameter settings, and the like. In the context of the present teaching, "expected shading" may be associated with the area and time that the system is covered by shadows due to neighboring trees, building, structures, etc. It may be expressed in units of % coverage per hour for each time period of interest comprising months, seasons, years, billing periods, and the like. This quantity may be useful in estimating the performance of the system. The System Installation Data are static in time meaning that they may not generally change once established. The System Installation Data may be entered into the central database and associated with the unique System Identification Data previously entered. System Performance Data and ambient condition data are collected continuously at a predefined interval after start-up of the system, said System Performance Data comprising, system response, system performance, ambient temperature, solar irradiance, conversion efficiency, current tilt angle, system energy output, current firmware revision, current system parameter settings, device fault and error codes, power, voltage, cumulative energy generated, and the like. The System Performance Data change with time and are entered into the central database as a time series with associated date and time stamps. The temporal System Performance Data are associated with the unique System Identification Data previously entered. The data correlated to the installation region may be aggregated to several levels of granularity, said levels comprising country, time zone, state or province, county, postal code, Global Positioning System (GPS) coordinates, and the like. Additionally, System History Data may be associated with each unique System Identification Data record. The System History Data captures changes in the System Configuration Data over time. Examples of System History Data comprise time-to-first-service-call, details of the service calls, steps taken to resolve the issues in the service calls, upgrades to the system configuration, new firmware revisions, new parameter settings, and the like. Entries in the System History Data typically contain date and time stamps so that changes may be tracked over the life of the system.

Through the services provided, the data may be manipulated and parsed by the various Supply Chain Entities subject to various security measures as discussed below. A plurality of standard procedures exists to aid in the manipulation of the data. Examples of suitable procedures comprise methods for calculating typical statistical values such as mean, median, average, standard deviation, maximum value, minimum value, variance, and the like. These procedures are listed as illustrations only and do not limit the scope of the present invention in any way. Alternatively, the Supply Chain Entities may develop and generate a custom procedure to extract and manipulate the data for their specific purpose.

Figure 5:
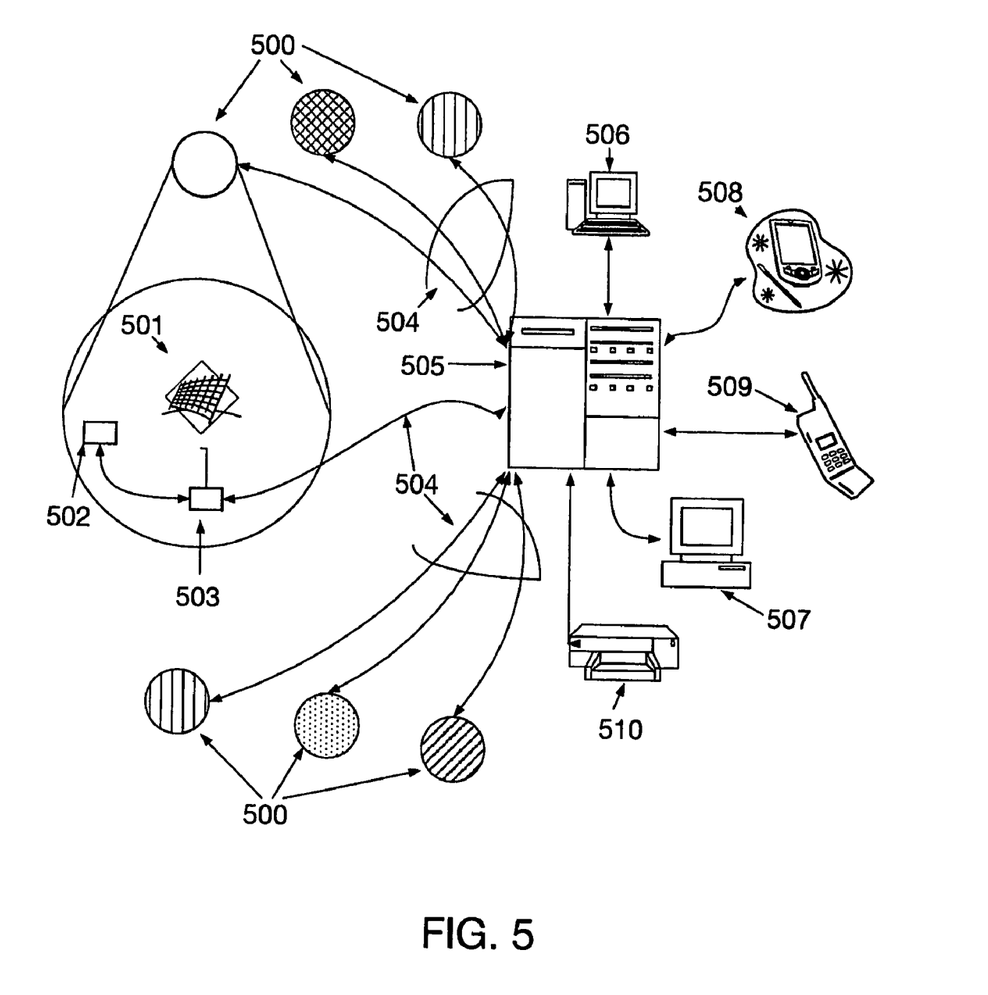
FIG. 5 is a schematic representation of a system pertaining to some embodiments of the present invention.

The database may contain data from systems installed worldwide by a large number of Supply Chain Entities. The different pattern fill of the circles representing systems, 500, illustrated in FIG. 5 is meant to convey that these systems are associated with different Supply Chain Entities. Comparisons and analyses may be completed by aggregating data from systems with similar features comprising System Integrator ID, VAR ID, Installation Technician ID, expected system power output, system configuration with OEM component identification, system wiring details, system tracking features, system tracking capabilities, installation region, system orientation, system tilt angle, expected shading, firmware revision, system parameter settings, system response, system performance, ambient temperature, solar irradiance, conversion efficiency, current tilt angle, system energy output, device fault and error codes, power, voltage, cumulative energy generated, and the like. Advantageously, the database enables the Supply Chain Entities to compare detailed data across systems under their responsibility or to compare their data to benchmark or aggregated data across the entire database. For example, a System Integrator may compare detailed data for his systems installed across a large region such as North America. Alternatively, the same System Integrator may compare data for one or more of his systems with benchmark or aggregated data for systems installed in a completely different region such as Europe.

The systems and methods may include a number of security measures to protect the intellectual property and confidential information for the various Supply Chain Entities of the renewable energy system supply chain. The security measures comprise software passwords, tokens, smart cards, biometric identification means, and the like. The security measures ensure that any specific System Integrator, VAR, or OEM manufacturer is only allowed access to the detailed data generated by systems under their specific responsibility. However, the System Integrators, VARS, or OEM manufacturers may request results based on the analysis of the aggregated data across the database so that they may compare their data to the larger population of systems.

The aggregated data may be used to generate a number of installed system performance benchmark metrics, said benchmark metrics comprising system performance, energy generation, current, voltage, device error codes, system efficiency, system response time, "typical meteorological year" (TMY) data, and the like. Values may be selected that may establish the benchmark metrics. The services may use the collected, aggregated, analyzed data and the benchmark metric to develop a "Best Known Method" (BKM) system configuration.

Typically, the services may compare individual system performance metrics to the benchmark metrics and highlight systems whose performance exceeds the benchmark metrics. The services may compare the details of the system such as system configuration, OEM components, system size, installation region, system orientation, system tilt angle, system tracking features, system tracking capabilities, sun irradiance, and the like to the BKM configuration. If the difference is significant as determined by the System Integrators, VARs, or OEM manufacturers and is correlated with other systems with similar configurations, the data may be used to improve the benchmark metrics and the system configuration may be used to update the BKM configuration. This activity occurs during the Optimization and Burn-in phase, 201, as illustrated in FIG. 2.

Figure 2:
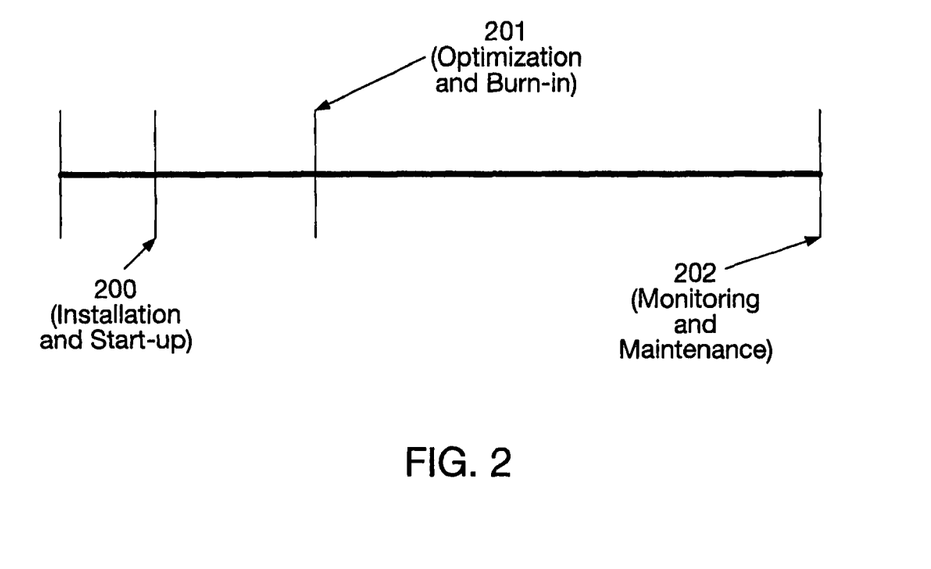
FIG. 2 represents a schematic representation of a timeline illustrating the various phases of "Installation and Configuration", "Optimization and Burn-in", and "Monitoring and Maintenance" comprised in various embodiments of the present invention.

Referring now to FIG. 2, the Monitoring and Maintenance phase, 202, the services may monitor the system performance and may highlight systems whose performance falls below the benchmark metrics. This data may highlight systems that may need attention. Typically, this functionality has only been implemented locally at the site of the system installation. The ability to provide this functionality, data collection, data aggregation, data analysis, and automated response from a central location is advantageously provided by some embodiments of the present invention. The services may provide initial levels of troubleshooting and corrective action responses to the poor system performance. The responses may comprise identifying differences between the system configuration and the BKM configuration and the like. The differences may be in parameters comprising, internal system settings, firmware version number, preferred OEM components, upgraded hardware, and the like.

Typically, the services may recommend actions that may comprise hardware upgrades, firmware upgrades, requirement for on-site service calls, and the like. The services may determine if the system might be covered by warranties or service contracts. The services may notify the System Integrators, VARS, and OEM component suppliers of the results of the initial troubleshooting activities and the recommended corrective action.

The recommended corrective action may include a list of the upgrades and hardware suggested to make the system conform to the BKM configuration. This may offer a Sales opportunity to the System Integrators, VARs, and OEMS. The services generate the demand for the hardware and notify the System Integrators, VARs, and OEMs that the hardware may be required to return the system to expected performance. Additionally, the services may determine if the hardware failure might be due to normal product lifetime performance or might be unexpected based on the aggregated lifetime data from the central database. In the case of normal lifetime failure, the services may generate notices, forms, list of nearby drop-off locations, shipping labels and the like to make sure the old hardware is properly discarded or recycled upon replacement. In the case of unexpected failure, the services may generate notices, RMA numbers, forms, list of locations of nearest authorized dealers, shipping labels and the like to make sure the old hardware is returned to the OEMs for failure analysis upon replacement.

Figure 3:
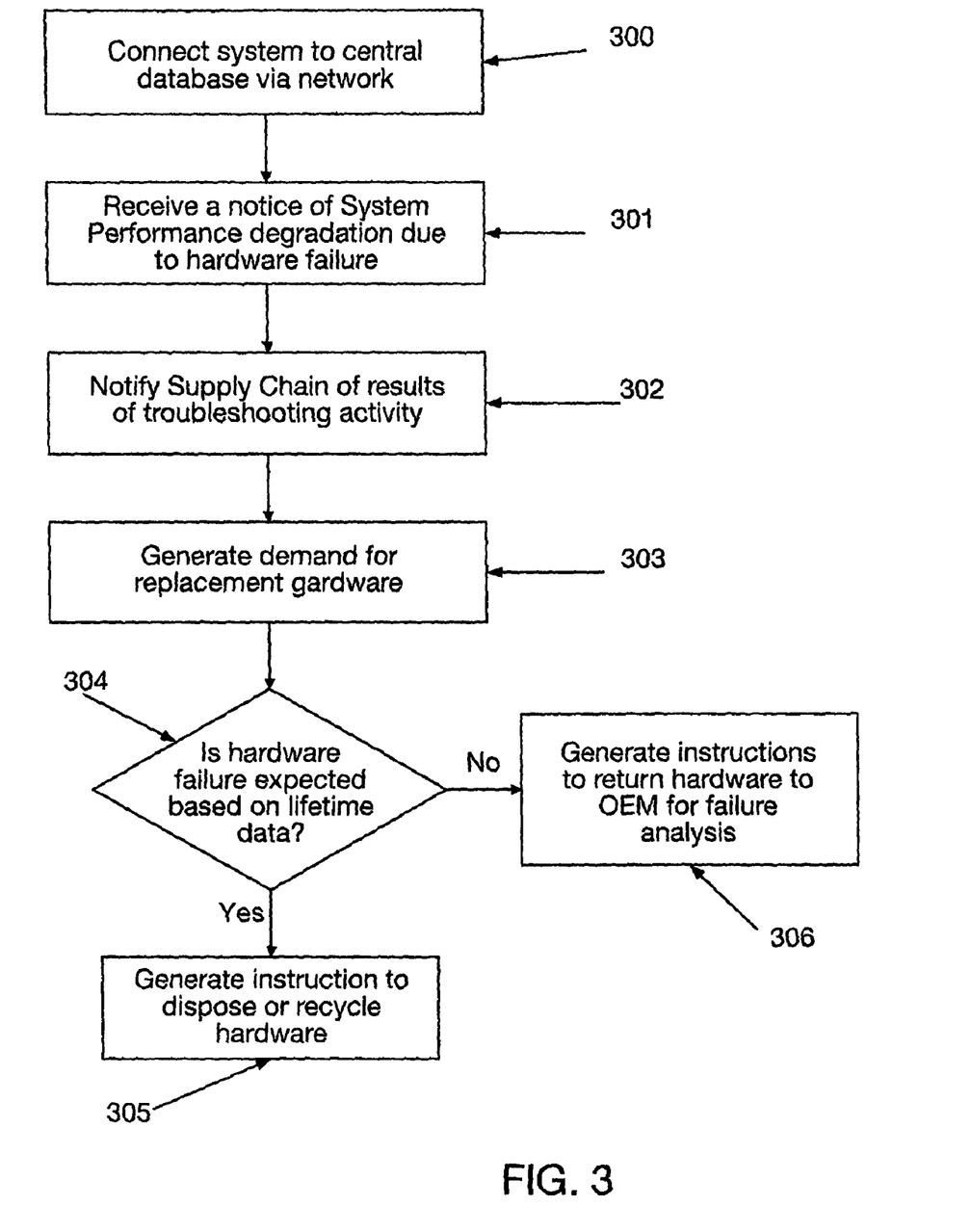
FIG. 3 is a flow chart of steps in some embodiments of the present invention.

In some embodiments of the present invention, the methods and procedures for monitoring system performance, receiving notification that a system is exhibiting degraded performance based on hardware failure, notifying the Supply Chain Entities of the results of a troubleshooting activity, generating a demand for replacement hardware, determining if the hardware failure might be due to expected based on lifetime data, generating instructions to the Installation Technician to properly dispose of the hardware if the failure might be expected based on lifetime data, and generating instructions to the Installation Technician to return the hardware to the OEM for failure analysis if the failure might not be expected based on lifetime data may follow the steps, 300-306, as outlined in FIG. 3. These exemplary steps are not meant to limit the scope of the present invention.

In some embodiments of the present invention, the aggregated data may be used to offer services to the various Supply Chain Entities that may highlight hardware that may be nearing the end of its useful life and may need replacing before the hardware exhibits a failure. The aggregated database may allow a Mean Time Between Failure attribute to be established for the hardware with high confidence. The services may use this attribute to notify the various Supply Chain Entities that a system may be comprised of hardware that is nearing the end of its useful life. This may produce an opportunity for an upgrade or sales opportunity for the Supply Chain Entities. Additionally, the End User may gain the benefit of improved system performance and minimized system downtime.

The services may track the lifetime and performance of the components for an exemplary system. The services may highlight systems and components that are nearing the end of their useful life. The services may generate notices, forms, alerts, and the like to notify the Supply Chain Entities of the potential future failure based on the aggregated data. The Supply Chain Entities may contact the End User to discuss the options to replace or upgrade the hardware. This is advantageous for the End User because it may allow the hardware to be ordered before the failure and may allow the replacement of the hardware to be schedule rather than reacting to an unexpected failure.

The services may be enabled to perform upgrades of internal system settings and firmware for systems covered by warranties or service contracts. Upon completion of the responses, the services may acknowledge an electronic receipt of the change in system configuration and update the database in the System History Data file. Failure and lifetime data may be included in the services used to generate and maintain the BKM configuration.

The services may assist the System Integrators and VARs with improved service resource allocation. The System Integrators may populate the central database with a number of lists, said lists comprising, "Critical Failure" list, a "Certified VAR" list, and the like. The System Integrators may also establish a "Strategic Value Index" for each End User, said Strategic Value Index determined from factors comprising End User market share, End User revenue stream, End User profit margin, End User partnership activities, and the like. The services may compare the reported failure to the Critical Failure list. If the failure is on the Critical Failure list, the services may give the system a high priority that requires attention. If the failure is not on the Critical Failure list, the services may determine if the system performance is likely to fall below the performance guarantee commitment for the current guarantee period. This is a particularly advantageous aspect of some embodiments of the present invention because the service may predict the probability that the performance guarantee commitment may not be met in time for the System Integrators to take appropriate action and prevent paying penalty charges. If the system might not meet the performance guarantee and is serviced by a Certified VAR, then the services may give the system the next level of priority so that appropriate action may be taken.

Systems that exhibit failures that are not on the critical failure list, are not serviced by a Certified VAR, or might still meet the current performance guarantee commitment may be given a priority for attention as determined by any number of priority procedures selected by the System Integrators, said procedures comprising, a "First-In-First-Out (FIFO)" queuing system, a priority based on the shortest time to respond, a priority based on the lowest cost to respond, a priority based on the strategic value index of the End User and the like. The System Integrators may enjoy the benefits of prioritized customer service based on criticality of failures, participation in the Certified VAR network, and financial exposure due to failure to meet performance guarantees.

The recommended action may include a list of the upgrades and hardware required to make the system conform to the BKM configuration. This may offer a Sales opportunity to the System Integrators, VARs, and OEMs. The services may generate the demand for the hardware and notify the System Integrators, VARS, and OEMs that the hardware may be required to return the system to expected performance. Additionally, the service may determine if the hardware failure might be due to normal product lifetime performance or might be unexpected based on the aggregated lifetime data from the central database. In the case of normal lifetime failure, the services may generate notices, forms, list of nearby drop-off locations, shipping labels and the like to make sure the old hardware is properly discarded or recycled upon replacement. In the case of unexpected failure, the services may generate notices, RMA numbers, forms, list of locations of nearest authorized dealers, shipping labels and the like to make sure the old hardware is promptly returned to the OEMs for failure analysis upon replacement.

Figure 4:
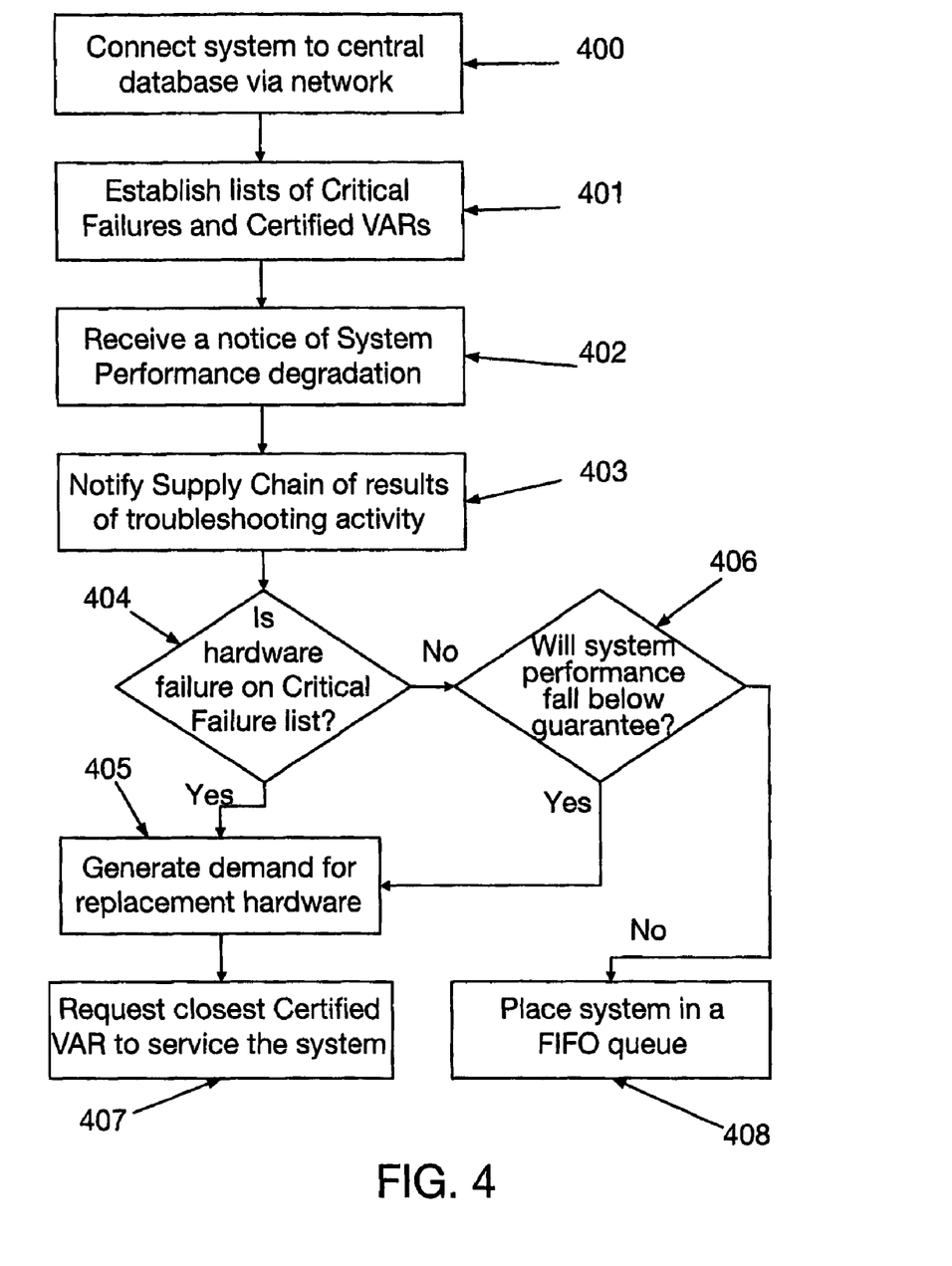
FIG. 4 is a flow chart of steps in some embodiments of the present invention.

In some embodiments of the present invention, the methods and procedures for monitoring system performance, establishing lists of Critical Failures and Certified VARS, receiving notification that a system is exhibiting degraded performance based on hardware failure, notifying the Supply Chain Entities of the results of a troubleshooting activity, determining if the System Performance metrics might fall below the guarantee for the current guarantee period, determining if the hardware failure might be on the critical failure list, generating a demand for replacement hardware, generating a request for service to the closest Certified VAR, and placing the system in a "First-In-First-Out" priority queuing system if the system is not serviced by a VAR on the Certified VAR list or the System Performance metrics might not fall below the performance guarantee for the current guarantee period and the hardware failure is not on the Critical Failures List may follow the steps, 400-408, as outlined in FIG. 4. These exemplary steps are not meant to limit the scope of the present invention.

Referring now to FIG. 5, the methods of some embodiments of the present invention may be implemented on a plurality of systems. The systems may comprise one or more energy systems, 500, sensors contained within the energy system to monitor various settings and performance attributes of the energy system, sensors associated with the energy system to measure various environmental conditions, 502, a local communications device for managing two-way communications between the sensors, the energy systems, and a network, 503, a network for transmitting the data to a centralized database, 504, a centralized database for receiving and storing data from the plurality of systems, 505, user interfaces for interacting with the centralized database, 506-509, procedures for acting upon the data, and a plurality of output devices for displaying the results of the procedure action, 506-510.

Continuing to refer to FIG. 5, in some exemplary embodiments comprising solar energy generation systems, the sensors contained within the system may monitor various settings and performance attributes comprising, system response, system performance, conversion efficiency, current tilt angle, system energy output, current firmware revision, current system parameter settings, device fault and error codes, power, voltage, cumulative energy generated, and the like. Sensors associated with the system, 502, may measure various environmental conditions comprising ambient temperature, solar irradiance, and the like. The data may be communicated onto a network, 504, by a local communications device, 503. Examples of suitable networks comprise the Internet, a Local Area Network (LAN), a Wide Area Network (WAN), a wireless network, cellular networks (e.g., GSM, GPRS, etc.), combinations thereof, and the like. The data may be received and stored on a centralized database, 505. The data in the centralized database may be accessed by a plurality of user interfaces comprising computer terminals, 507, personal computers (PCs), 506, personal digital assistants (PDAs), 508, cellular phones, 509, interactive displays, and the like. This allows the user to be located remotely from the centralized database. As mentioned previously, the centralized database contains a variety of security features to prevent sensitive detailed data from being viewed or accessed by users without the proper security clearance. Procedures may be used to act on the data to generate results of various inquires. The procedures may be part of a standard set of calculations or may be developed and generated by the user. The results of the action by the procedures may be displayed to the user on a number of output means. Examples of suitable output means comprise computer terminals, 507, personal computers (PCs), 506, printers, 510, LED displays, personal digital assistants (PDAs), 508, cellular phones, 509, interactive displays, and the like.

Figure 6:
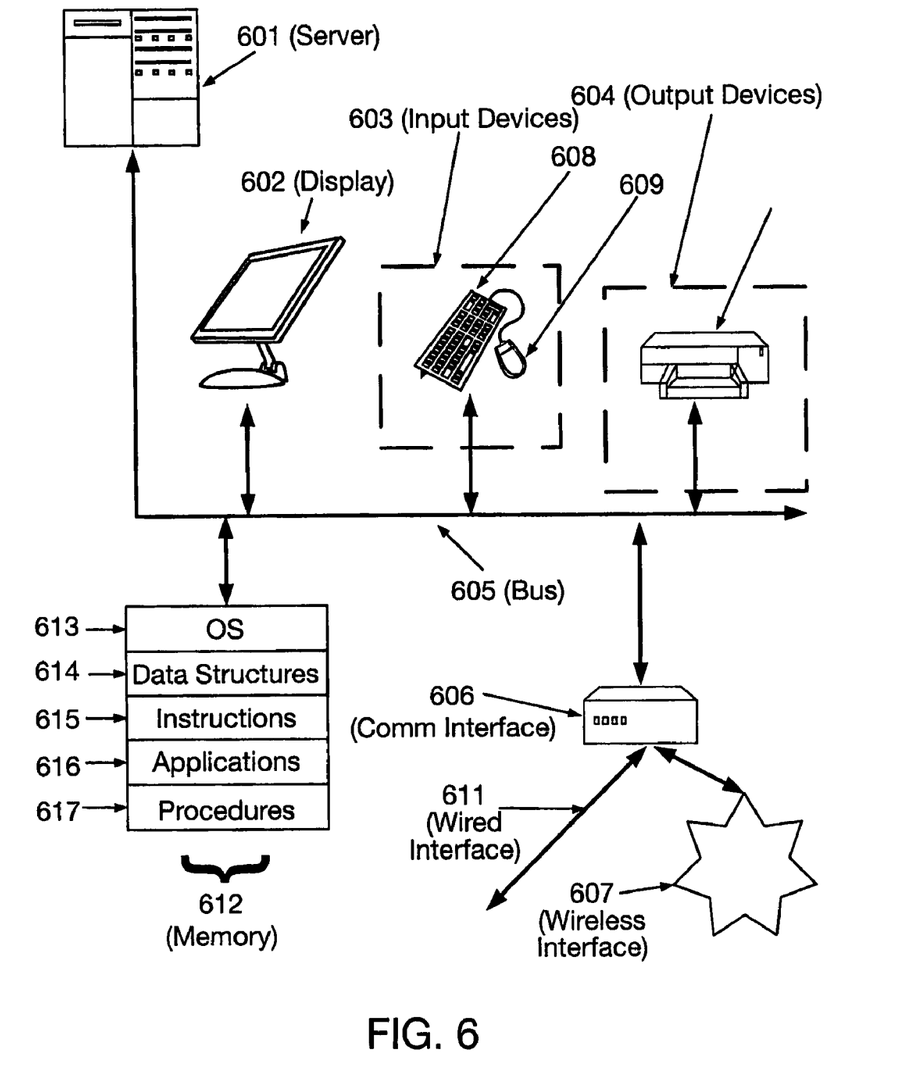
FIG. 6 depicts an illustrative computer system pertaining to various embodiments of the present invention.

FIG. 6 depicts an illustrative computer system pertaining to various embodiments of the present invention. In some embodiments, the computer system comprises a server 601, display, 602, one or more input interfaces, 603, communications interface, 606, and one or more output interfaces, 604, all conventionally coupled by one or more buses, 605. The server, 601, comprises one or more processors (not shown) and one or more memory modules, 612. The input interfaces, 603, may comprise a keyboard, 608, and a mouse, 609. The output interface, 604, may comprise a printer, 610. The communications interface, 606, is a network interface that allows the computer system to communicate via a wireless or hardwired network, 607, as previously described. The communications interface, 607, may be coupled to a transmission medium, 611, such as a network transmission line, for example, twisted pair, coaxial cable, fiber optic cable, and the like. In another embodiment, the communications interface, 611, provides a wireless interface, that is, the communication interface, 611 uses a wireless transmission medium. Examples of other devices that may be used to access the computer system via communications interface, 606, comprise cell phones, PDAS, personal computers, and the like (not shown).

The memory modules, 612, generally comprises different modalities, illustratively semiconductor memory, such as random access memory (RAM), and disk drives as well as others. In various embodiments, the memory modules, 612, store an operating system, 613, collected and aggregated data, 614, instructions, 615, applications, 616, and procedures, 617.

In various embodiments, the specific software instructions, data structures and data that implement various embodiments of the present invention are typically incorporated in the server, 601. Generally, an embodiment of the present invention is tangibly embodied in a computer readable medium, for example, the memory and is comprised of instructions, applications, and procedures which, when executed by the processor, causes the computer system to utilize the present invention, for example, the collection, aggregation, and analysis of data, establishing benchmark metrics for performance, comparing performance data to the benchmark metrics, identifying systems that exhibit degraded performance, initiating troubleshooting procedures, improving service prioritization, displaying the results of the analyses, and the like. The memory may store the software instructions, data structures, and data for any of the operating system, the data collection application, the data aggregation application, the data analysis procedures, and the like in semiconductor memory, in disk memory, or a combination thereof.

The operating system may be implemented by any conventional operating system comprising Windows® (Registered trademark of Microsoft Corporation), Unix® (Registered trademark of the Open Group in the United States and other countries), Mac OS® (Registered trademark of Apple Computer, Inc.), Linux® (Registered trademark of Linus Torvalds), as well as others not explicitly listed herein.

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 6 is not intended to limit the present invention. Other alternative hardware environments may be used without departing from the scope of the present invention.

The foregoing descriptions of exemplary embodiments of the present invention have been presented for the purpose of illustration and description. They are not intended to be exhaustive or to limit the present invention to the precise forms disclosed, and obviously many modifications, embodiments, and variations are possible in light of the above teaching.

What is claimed is:

1. A computer implemented method for generating a demand for hardware in response to a decrease in system performance, comprising:
   connecting an installed System (500) to a central database (505) via a network (504);
   identifying a decrease in System Performance metrics due to a hardware failure (301);
   notifying the System Integrators, VARs, and OEM manufacturers of the results of troubleshooting or corrective action activities, said results indicating a need for replacement hardware (302);
   generating a demand for said replacement hardware (303);
   determining if said hardware failure might be expected based on aggregated lifetime data contained within said central database (304);
   generating instructions to an Installation Technician to properly discard or recycle the failed hardware if said hardware failure might be expected based on aggregated lifetime data contained within said central database (305); and
   generating instructions to said Installation Technician to return said failed hardware to said OEM manufacturer if said hardware failure might not be expected based on aggregated lifetime data contained within said central database (306).

2. The method of claim 1 wherein said System comprises an energy system.

3. The method of claim 2 wherein said energy system comprises an energy usage system an energy storage system, an energy management system, or an energy generation system.

4. The method of claim 3 wherein said energy generation system comprises a renewable energy generation system.

5. The method of claim 4 wherein said renewable energy generation system comprises a solar energy generation system, a wind turbine energy generation system, a tidal energy generation system, a geothermal energy generation system, or a waste to energy system.

6. A computer implemented method for determining the priority of Service activities, comprising:
   connecting an installed System (500) to a central database (505) via a network (504);

establishing a Critical Failures List of failures that may require attention (401);

establishing a list of Certified VARs (401);

identifying a decrease in System Performance metrics due to a hardware failure (402);

notifying the System Integrators, VARs, and OEM manufacturers of the results of troubleshooting or corrective action activities, said results indicating a need for replacement hardware or an on-site Service call (403);

determining if said System Performance metrics may fall below a performance guarantee for the current guarantee period (406);

determining if said hardware failure is on said Critical Failures List (404);

generating a demand for said replacement hardware if said hardware failure is on said Critical Failures List (405);

generating a request for dispatch of the closest Certified VAR for an on-site Service call if said hardware failure is on said Critical Failures List (407); and placing said system in a "First-In-First-Out" (FIFO) queuing system for response if said system is not serviced by a VAR on said Certified VAR list or said System Performance metrics may not fall below said performance guarantee for the current guarantee period, and said hardware failure is not on said Critical Failures List (408).

7. The method of claim 6 wherein said System comprises an energy system.

8. The method of claim 7 wherein said energy system comprises an energy usage system an energy storage system, an energy management system, or an energy generation system.

9. The method of claim 8 wherein said energy generation system comprises a renewable energy generation system.

10. The method of claim 9 wherein said renewable energy generation system comprises a solar energy generation system, a wind turbine energy generation system, a tidal energy generation system, a geothermal energy generation system, or a waste to energy system.

11. A system for generating a demand for replacement hardware in response to a decrease in energy system performance, comprising:

one or more Energy Systems (500); sensors contained within said Energy Systems to monitor said Energy Systems settings and performance attributes data;

sensors associated with said Energy Systems to measure environmental conditions data (502);

a local communications device for communicating said Energy Systems settings and performance attributes data and said environmental conditions data onto a network (503);

a network for transmitting said Energy Systems settings and performance attributes data and said environmental conditions data (504);

a centralized database for receiving and storing said Energy Systems settings and performance attributes data and said environmental conditions data (505);

a user interface for interacting with said centralized database (506-509, 603, 608, 609);

a computer readable medium containing procedures for acting upon said Energy Systems settings and performance attributes data and said environmental conditions data (612-617);

wherein said procedures comprise:

procedures for identifying a decrease in System Performance metrics due to a hardware failure (301);

procedures for notifying the System Integrators, VARs, and OEM manufacturers of the results of troubleshooting or corrective action activities, said results indicating a need for replacement hardware (302);

procedures for generating a demand for said replacement hardware (303); and display output devices for displaying the results of said procedure action upon said Energy Systems settings and performance attributes data and said environmental conditions data (506-510, 604, 610).

12. The system of claim 11 wherein said one or more Energy Systems comprise at least one Energy System selected from the group consisting of an energy usage system, an energy storage system, an energy management system, and an energy generation system.

13. The system of claim 12 wherein said energy generation system comprises a renewable energy generation system.

14. The system of claim 13 wherein said renewable energy generation system comprises a solar energy generation system, a wind turbine energy generation system, a tidal energy generation system, a geothermal energy generation system, or a waste to energy system.

15. The system of claim 11 wherein said procedures further comprise:

procedures for establishing that the performance metrics of said Energy Systems do not conform to established benchmark metrics for Energy Systems performance metrics;

procedures for generating lists of suggested actions to improve said Energy Systems performance metrics to conform to said benchmark metrics; and procedures for sending said lists to said display output devices.

16. A system for determining the priority of Service activities, comprising:

one or more Energy Systems (500);

sensors contained within said Energy Systems to monitor said Energy Systems settings and performance attributes data;

sensors associated with said Energy Systems to measure environmental conditions data (502);

a local communications device for communicating said Energy Systems settings and performance attributes data and said environmental conditions data onto a network (503);

a network for transmitting said Energy Systems settings and performance attributes data and said environmental conditions data (504);

a centralized database for receiving and storing said Energy Systems settings and performance attributes data and said environmental conditions data (505);

a user interface for interacting with said centralized database (506-509, 603, 608, 609);

a computer readable medium containing procedures for acting upon said Energy Systems settings and performance attributes data and said environmental conditions data (612-617);

wherein said procedures comprise:

procedures for establishing a Critical Failures List of failures that may require attention (401);

procedures for establishing a list of Certified VARs (401);

procedures for identifying a decrease in System Performance metrics due to a hardware failure (402);

procedures for notifying the System Integrators, VARs, and OEM manufacturers of the results of troubleshooting or corrective action activities, said results indicating a need for replacement hardware or an on-site Service call (403);

procedures for determining if said System Performance metrics may fall below a performance guarantee for the current guarantee period (406);

procedures for determining if said hardware failure is on said Critical Failures List (404);

procedures for generating a request for dispatch of the closest Certified VAR for an on-site Service call if said hardware failure is on said Critical Failures List (407);

procedures for placing said system in a "First-In-First-Out" (FIFO) queuing system for response if said system is not serviced by a VAR on said Certified VAR list or said System Performance metrics may not fall below said performance guarantee for the current guarantee period, and said hardware failure is not on said Critical Failures List (408); and display output devices for displaying the results of said procedure action upon said Energy Systems settings and performance attributes data and said environmental conditions data (506-510, 604, 610).

17. The system of claim 16 wherein said one or more Energy Systems comprise at least one Energy System selected from the group consisting of an energy usage system, an energy storage system, an energy management system, and an energy generation system.

18. The system of claim 17 wherein said energy generation system comprises a renewable energy generation system.

19. The system of claim 18 wherein said renewable energy generation system comprises a solar energy generation system, a wind turbine energy generation system, a tidal energy generation system, a geothermal energy generation system, or a waste to energy system.

20. The system of claim 16 wherein said procedures further comprise:

procedures for establishing that the performance metrics of said Energy Systems do not conform to established benchmark metrics for Energy Systems performance metrics;

procedures for generating lists of possible failures and suggested actions to improve said Energy System performance metrics to conform to said benchmark metrics; and procedures for determining the priority of service response based on prioritization procedures comprising, failure corresponding to a failure on a Critical Failure List, warranty guarantees, Service Contracts, responsibility for the system by a VAR on a Certified VAR list, or First-In-First-Out scheduling.

* * * * *